United States Patent
Herendeen et al.

(10) Patent No.: US 6,398,467 B1
(45) Date of Patent: Jun. 4, 2002

(54) ONE PIECE CUTTER BODY

(75) Inventors: Max E. Herendeen, Churubusco, IN (US); Kenneth J A Keller, Jackson, MO (US); Andrew A. Reuvers, Ortonville, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 08/589,652

(22) Filed: Jan. 22, 1996

(51) Int. Cl.$^7$ ................................................. B23F 21/12

(52) U.S. Cl. ............................... 409/25; 407/22; 409/39

(58) Field of Search ........................... 407/21, 22, 35, 407/33, 34, 20, 29; 409/25, 38, 39, 50

(56) References Cited

U.S. PATENT DOCUMENTS

| | | | |
|---|---|---|---|
| 2,385,750 A | | 9/1945 | Weddell ........................ 29/105 |
| 3,036,364 A | * | 5/1962 | Spear ............................ 407/21 |
| 4,268,194 A | | 5/1981 | Bloink et al. .................. 407/22 |
| 4,530,623 A | | 7/1985 | Kotthaus ....................... 407/22 |
| 4,621,954 A | | 11/1986 | Kitchen et al. ................ 407/22 |
| 4,790,693 A | * | 12/1988 | Koblesky ...................... 407/35 |
| 5,038,012 A | | 8/1991 | Walter ....................... 219/69.15 |
| 5,542,795 A | * | 8/1996 | Mitchell ....................... 407/35 |
| 5,618,449 A | * | 4/1997 | Houman ..................... 219/69.11 |

OTHER PUBLICATIONS

Photograph, "Die Werkzeuge fur das Zyklo–Palloid–Verfahren in Abhangigkeit vom Anwendungsbereich", Sonderdruck aus TZ fur praktische Metallbearbeitung, vol. 29 (No. S1), (Jul. 7, 1973).
Photographs Of Klingelnberg Cutterheads, vol. 125 (No. 17), p. 687, (Sep. 7, 1983).
Photographs, Industrie, vol. 100 (No. 68), p. 65, (Aug. 25, 1978).
Von H. Meyer, Martinsried, Und F.–M. Friedrich, Starnberg, "Ungeteilt erodierend gefertigtes Statorblech–Ausschneidwerkzeug", Werkstatt und Betrieb, p. 435, (Sep. 7, 1979).

\* cited by examiner

Primary Examiner—Daniel W. Howell
(74) Attorney, Agent, or Firm—Hahn Loeser & Parks LLP

(57) ABSTRACT

One-piece cutter body for gear cutting operations. The one-piece cutter body has a plurality of circumferentially spaced slots for receipt of gear cutting blade. The slots are formed by a heatless electroerosive process, preferably electron-discharge machining (EDM) process utilizes computer numerical control (CNC) methods. A cutter body having outstanding strength and durability with highly precise slot configurations is obtained.

4 Claims, 4 Drawing Sheets

ONE PIECE CUTTER BODY

BACKGROUND OF THE INVENTION

1. Field of the Invention

This invention relates to a cutter head or cutter body for a cutting assembly which is used in gear cutting operations.

2. Background Art

Spiral bevel, zerol and hypoid gears are well known and widely used throughout the automotive industry in a variety of drivetrain applications. Conventional methods for making each of these gears include face milling and face hobbing, with the two methods producing different gear tooth geometry which must be taken into consideration during the gear design. Gears produced by face milling typically have a tapered tooth depth, with the heel end of the tooth being deeper than the toe end of the tooth but they may also have uniform depth teeth. In contrast, gears produced by face hobbing always exhibit a uniform tooth depth. Face milling is an intermittent indexing process which cuts one tooth at a time and then indexes to the next slot so as to cut the adjacent tooth. This process is repeated until all of the teeth have been cut. Face milling is referred to as a two axis system since the work, or gear, is required to rotate in timed relationship with a cradle mechanism used to mount a cutter head assembly. In contrast, face hobbing is a continuous indexing process whereby all of the gear teeth are cut simultaneously. Face hobbing is considered a three axis process since the rotation of the gear, cradle, and cutter head assembly are all performed in timed relationship with one another. Face milling is an older process, with face hobbing becoming more important with the advent of computer numerical controlled machines which allows the user to produce either geometry. Customer requirements, engineering and production requirements are considered when selecting either face milling or face hobbing to produce a gear.

Each of the cutting methods utilizes a plurality of cutting blades which are mounted into slots, being typically four-sided and formed in a face of a cutter head. The cutter head, or cutter body, is a two-piece construction comprising a first, disk-like member and a second, backing ring member which is concentric with the disk. In a known cutter head, portions of each of the blade-receiving slots are formed in both the disk and the backing ring. The two members are sized such that they mate together in an interference fit and known cooling and heating techniques are utilized to assemble the parts. For instance, the disk may be cooled, so as to shrink or reduce its outer diameter, and the concentric backing ring member may be heated so as to increase its inner diameter. After assembly, the two parts may be welded or bolted together. This method of assembling the concentric members of the cutter head is known to cause thermal distortion in the slots which receive the individual cutting blades. This method of assembly also results in internal weaknesses, particularly at the interface between the first disk-like member and the second backing ring member. When a disk-like body member and a ring member are welded together, for example, thermal stresses are set up in the region of the interface, resulting in weaknesses in this region. These weaknesses in the cutter body or cutter head allow the cutter head to be easily damaged and may lead to eventual failure. Upon damage or failure of the cutter head, attempts to repair the cutter head prove to be difficult and expensive, to the extent that such procedures are prohibitive and generally not employed. The damage or failure of the cutter head may also simply not be repairable. The two-piece configuration may further result in errors in positioning of the components which can translate into errors in cutting operations using the cutting head. In spite of the known disadvantages of a two-piece cutter head, the two-piece cutter head continues to be universally used and is the standard in the industry.

SUMMARY OF THE INVENTION

This invention according to one aspect provides a one-piece cutter body for a cutting assembly used in gear cutting operations, wherein the body is formed from a single piece of metal, and wherein further the body comprises opposite first and second faces and a sidewall. The invention further comprises a plurality of circumferentially spaced slots formed in one of the faces which extend through the body to the opposite face, the slots being adapted to receive cutting tools in positions projecting from at least one face of the body, with the slots being formed by an essentially heatless process. The preferred process for forming the slots is electron-discharge machining (EDM). The EDM process preferably utilizes computer numerical control (CNC) methods to attain highly accurate slot configurations within the one-piece body.

This invention according to a further aspect provides a method for forming a one-piece cutter body for gear cutting operations. This method comprises providing as a work piece a one-piece metal blank having opposite parallel first and second surfaces corresponding respectively to first and second faces of a desired finished cutter body, and forming in the metal blank a plurality of circumferentially spaced slots. Each slot is formed to extend from the first face to the second face, and wherein forming of the slots comprises electroerosively machining the blank until a desired slot configuration is obtained. The slots are preferably formed by electron discharge machining (EDM), utilizing computer numerical control (CNC) methods so that a highly precise slot configuration is obtained.

DESCRIPTION OF A PREFERRED EMBODIMENT

Figure 4:
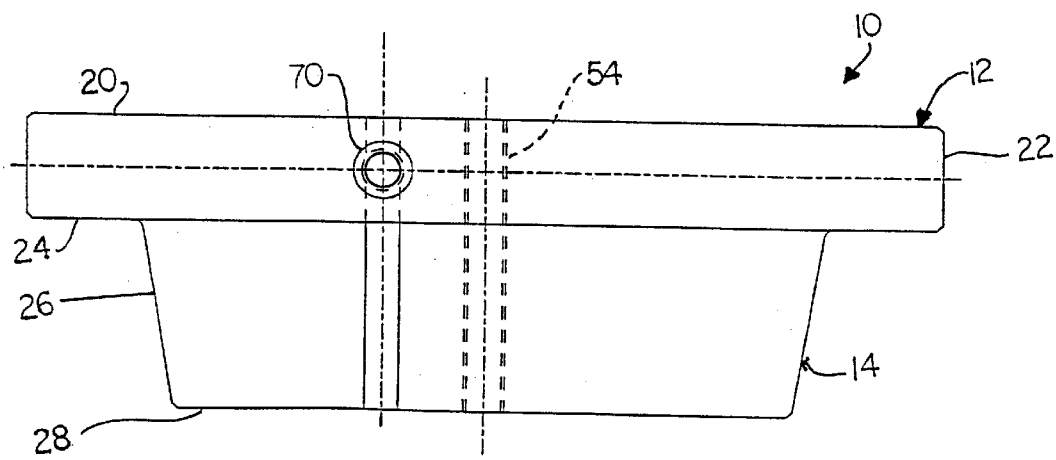
FIG. 4 is a side-elevational view of a cutter body shown in FIG. 1.

This invention will now be described in detail with particular reference to the best mode and preferred embodiment thereof Referring now to FIGS. 1–4 of the drawings, 10 is one-piece cutter body or cutter head according to this invention. The preferred cutter body 10 is a surface of revolution comprising a cylindrical portion 12 and a frustoconical portion 14 which have a common central axis A as shown in FIG. 4. Frustoconical portion 14 projects axially in one direction from the cylindrical portion 12.

Cutter body 10 is formed from a single piece of metal as will be hereinafter described. Hence the cylindrical portion 12 and the frustoconical portion 14 are integrally formed with no interface or weldment between the two sections.

The cylindrical portion 12 of cutter body 10 has a planar first end face 20, which is circular in shape and perpendicular to central axis A. A cylindrical sidewall 22 extends around the circumference of end face 20 and intersects the end face at right angles. An annular surface 24 is planar and parallel to the end face 20.

The frustoconical portion 12 of cutter body 10 projects axially along axis A from annular surface 24 and comprises a frustoconical surface 26 which intersects annular surface 24, and a planar second end face 28, which is circular in shape.

Cutter body 10 has an axially extending bore 30 which is centered on axis A and which extends the entire length of the cutter body from the first end face 20 to the second end face 28. Axial bore 30 allows mounting and positioning of the cutter head 10 on a milling apparatus and may comprise a plurality of short, axially-spaced sections 31, 32, 33, 34, 35, 36, 37, 38, and 39 (which are numbered in order of location, beginning at first end surface 20). Section 34 is the smallest in diameter and forms a neck portion. A shoulder 40 may be provided between adjacent sections 33 and 34, and a second shoulder 42 may be provided between adjacent sections 38 and 39. Frustoconical sections (which are unnumbered) may be provided between the remaining adjacent sections. An annular groove 44 may be provided between bore section 33 and shoulder 40. A tapered end section 46 may be provided at the second end of the cutter body 10 between bore section 39 and second end face 28.

An annular groove 50, of larger diameter than bore 30 and radially spaced therefrom, may be provided in second end face 28, for attachment of a mounting plate or flange (not shown). Such mounting plate or flange is useful for mounting body 10 on a spindle in the course of assembling a gear cutting assembly. A radially extending recess 52 communicates with groove 50 and extends radially outwardly therefrom, and terminates short of the outer circumference of body 10. Screw holes 54 (two are shown) extending through the entire length of body 10 may be provided for securing such mounting plate or flange to the body 10.

Figure 1:
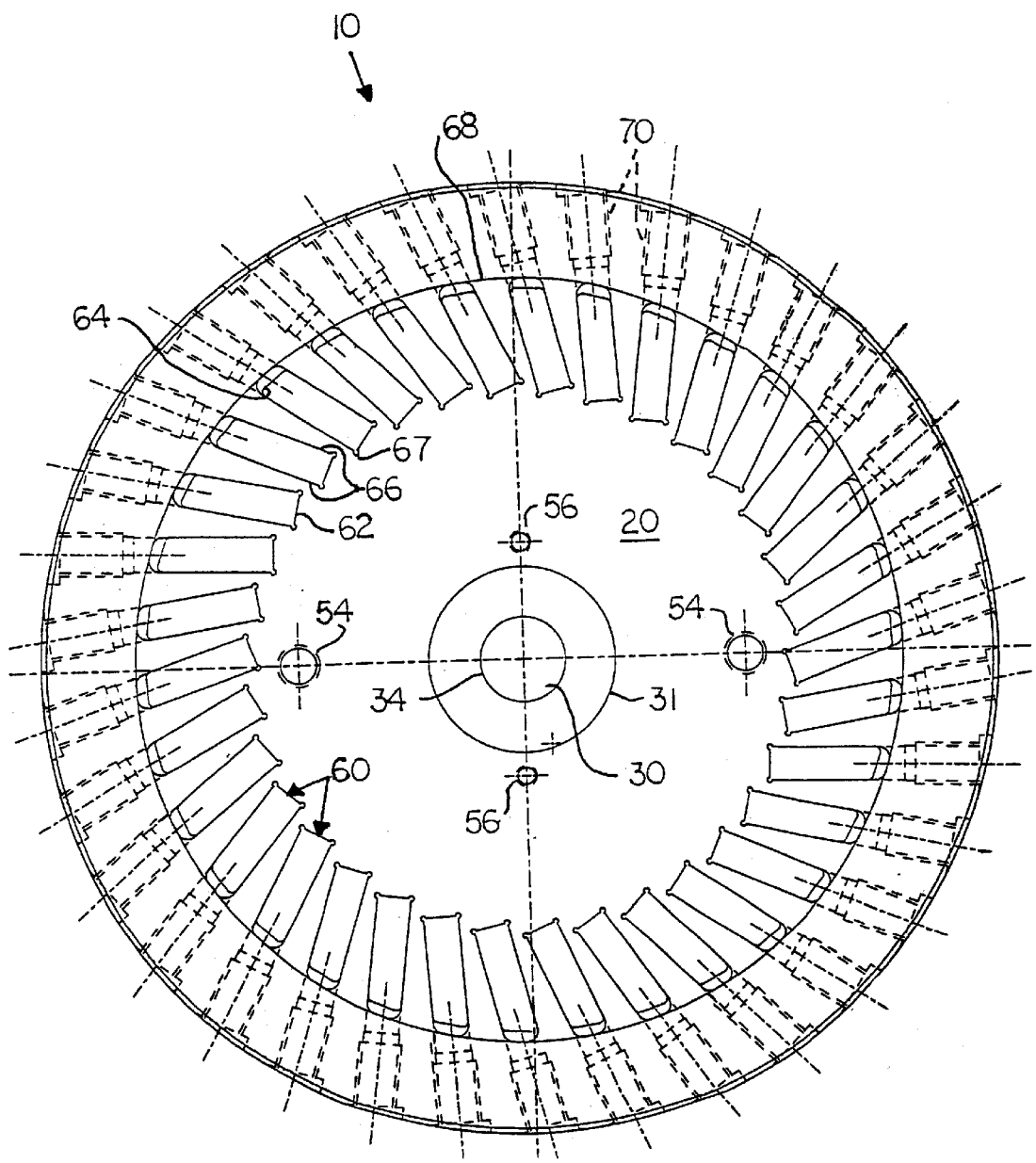
FIG. 1 is a top plan view of a preferred cutter body according to this invention.
Figure 2:
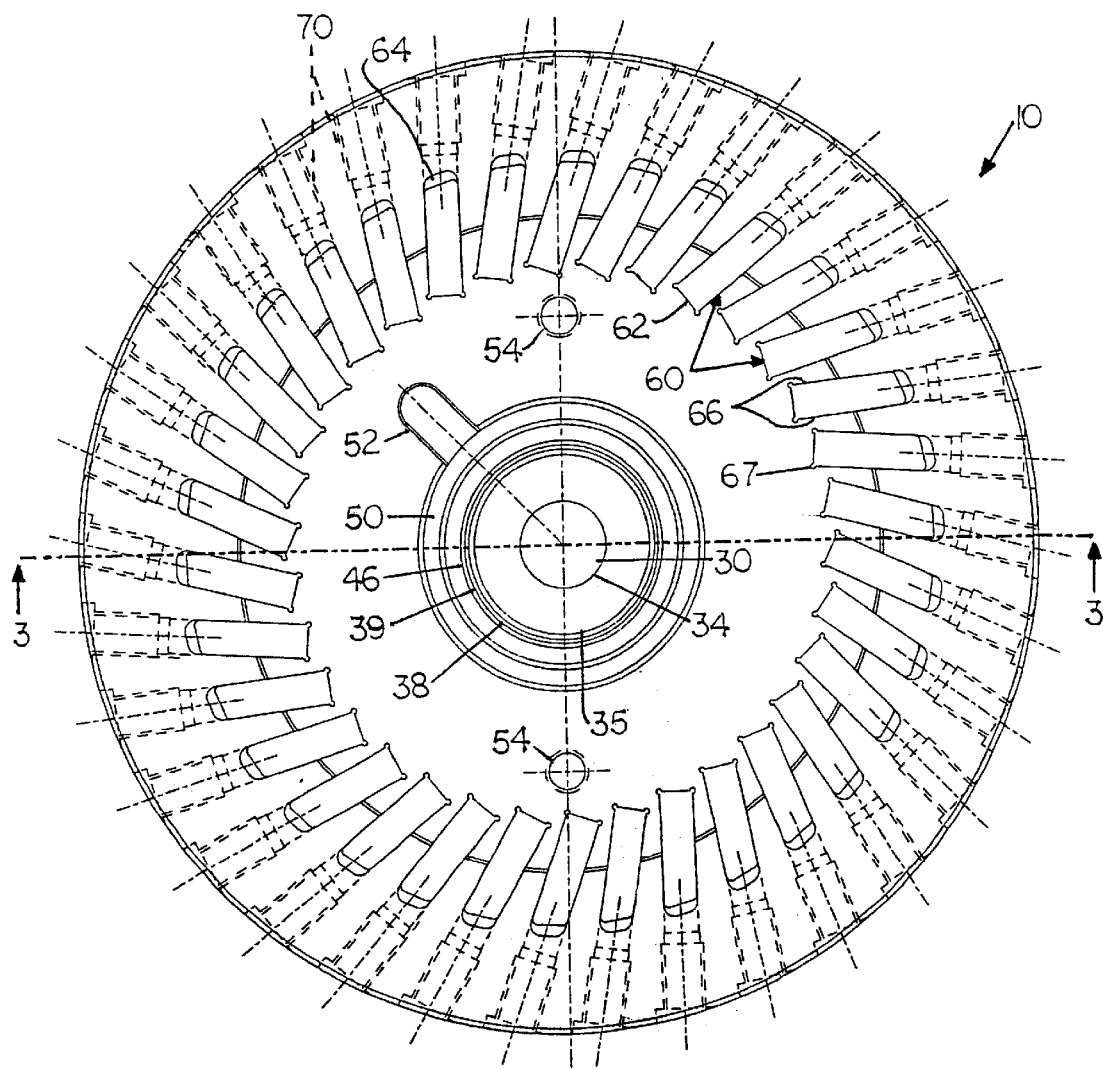
FIG. 2 is a bottom plan of the cutter body shown in FIG. 1.
Figure 3:
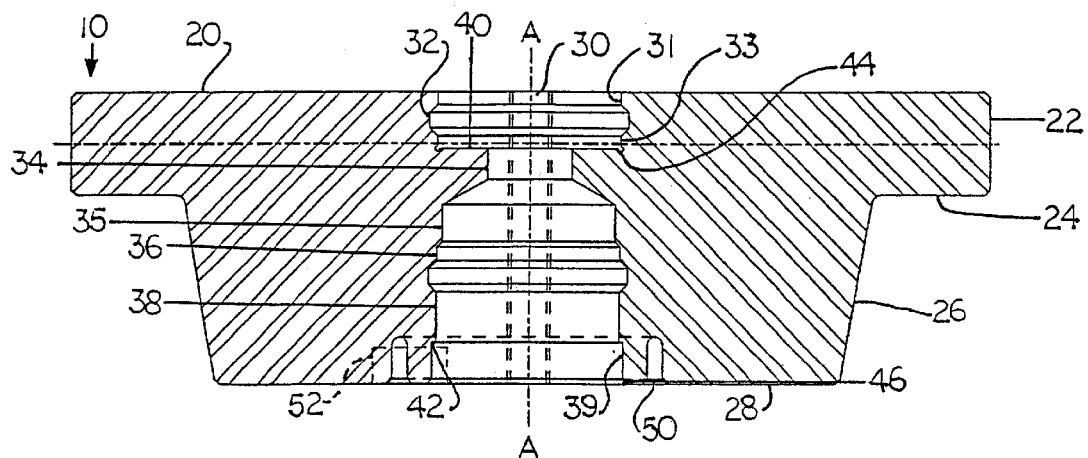
FIG. 3 is a vertical sectional view, taken along line 3—3 of FIG. 2.

A second set of screw holes 56 (e.g., two are shown in FIG. 1) may extend radially inwardly from first face 20. These screw holes may terminate inside body 10.

Cutter body 10 further includes a plurality of circumferentially-spaced slots 60 formed in one face thereof, such as face 20, and extend through the cutter body 10 to the opposite face 28. Each slot 60 has a blade-seating surface 62, which is an inner end wall, an outer end wall 64, which is disposed opposite the blade-seating surface 62. A pair of opposing sidewalls 66 extend from one end wall 62 to the opposite end wall 64. Grooves 67 may be provided along the side edges of blade receiving surfaces 62. The outer endwall 64 of slots 60 lie in a common circle 68. Likewise, the inner endwall 62 of slots 60 also lie in a common circle (not shown). Slots 60 are disposed at regular intervals around the entire circumference of circle 68.

Each slot 60 receives one or more cutting blades (not shown). The cutting blades are typically made of bar stock and are elongated articles which extend normal to end faces 20 and 28, with a portion of each blade protruding beyond the end face. The blade-receiving functions of slots in cutter bodies or heads, and suitable configurations of such slots and cutting blades are well known in the art.

Each slot 60 may also receive a clamping block, also known in the art, for the purpose of securing a cutting blade or tool (or more than one such blade where more than one blade is placed in a slot).

Slots 60 may be either tangentially oriented as shown, or radially oriented, depending upon the type of gear milling, cutting or grinding operation to be carried out. Both configurations and the respective operations for which each is best suited are known in the art.

All slots 60 may of identical configuration as shown, or may be of different configurations, e.g., two configurations arranged in alternating sequence, depending upon the desired number and configurations of cutting blades to be used. This in turn depends upon the gear cutting operation to be carried out.

Cutter body 10 also contains a plurality of circumferentially spaced screw holes 70.

These screw holes extend inwardly from cylindrical outer surface 22 of the body 10 to each of the respective slots 60. Screw holes 70 are disposed around the entire circumference of outer surface 22. In the preferred embodiment shown, the screw holes 70 are equally spaced. Each screw hole may receive a set screw (not shown) for the purpose of retaining the previously mentioned cutting blades and clamping blocks in position. Each screw hole 70 is axially aligned with a respective slot 60. Thus, where the slots 60 are tangentially arranged as shown, the screw holes 70 are also tangentially arranged. Likewise, when slots 60 are radially arranged, screw holes 70 are also radially arranged.

Slots 60 are preferably formed by electron-discharge machining (EDM). EDM is a method for removing metal from a work piece by erosion due to spark discharges. EDM is carried out in a liquid dielectric fluid medium (usually a hydrocarbon) utilizing a tool (or erosion head) having an electrode which is movable relative to the work piece. Electric arc discharge from the electrode to the work piece occurs, and the dielectric fluid carries away heat produced by the electric discharge, so that little or no temperature rise occurs. Hence the operation may be referred to as essentially heatless. EDM is known in the art; see, for example, Mark's Standard Handbook for Mechanical Engineers, 9th edition, 1987, page 13–73, edited by E. A. Avaleone and T. Baumeister III, published by McGraw Hill Co., New York; and U.S. Pat. No. 5,038,012.

The EDM process may be controlled by computer numerical control (CNC) methods. This makes it possible to obtain slots 60 of highly precise and highly reproducible configuration. Forming the slots 60 in this manner allows each of the cutter blades to be selectively positioned within the cutter head 10 to avoid errors that may occur as in prior art configurations, and to avoid any cumulative effect of such errors. This will allow production of improved gears with precise gear tooth geometries.

While a preferred cutter body 10 of this invention has the cylindrical portion and a frustoconical portion 14 as shown, a cutter body of this invention may be a one-piece, essentially cylindrical body having opposite first and second faces (preferably circular) of the same size or diameter, and a cylindrical side wall extending between the two faces. Such cylindrical cutter body may have a series of circumferentially spaced slots similar to the slots 60 illustrated herein.

A cutter head or body 10 according to this invention may be incorporated into a gear cutting assembly which may be as known in the art, except for use of the novel cutter body 10 of this invention. Similarly, the gear cutting assembly may form a part of a computer numerical control (CNC) gear cutting machine, which may also be known in the art except for cutter body 10.

A preferred method for forming a cutter body or cutter head 10 will now be described with reference to FIG. 5.

First, one provides as a work piece a one-piece metal blank having opposite and parallel first and second faces 20 and 28 which correspond to the first and second faces 20 and 28, respectively, in the finished cutter body 10. The distance between the opposite faces 20 and 28 in the work piece is the same as in the finished cutter body 10. The dimensions of the work piece in the two remaining directions must equal or exceed the corresponding dimensions in the finished cutter body 10. Thus, the starting work piece may be either square or cylindrical, or of other desired shape, but must have a length and width which equal or exceed the diameter of the cylindrical portion 10 of the finished cutter body.

The exterior configuration of the desired cutter body 10, comprising sidewall surfaces 22 and 26 and annular surface 24, may be formed either before or after the slots 60 are formed. Similarly, the axial bore 30 may be formed either before or after slots 60 are formed. Preferably the axial bore 30 is formed before slots 60 are formed so that the work piece can be mounted on a spindle and rotated in the course of forming slots 60.

Figure 5:
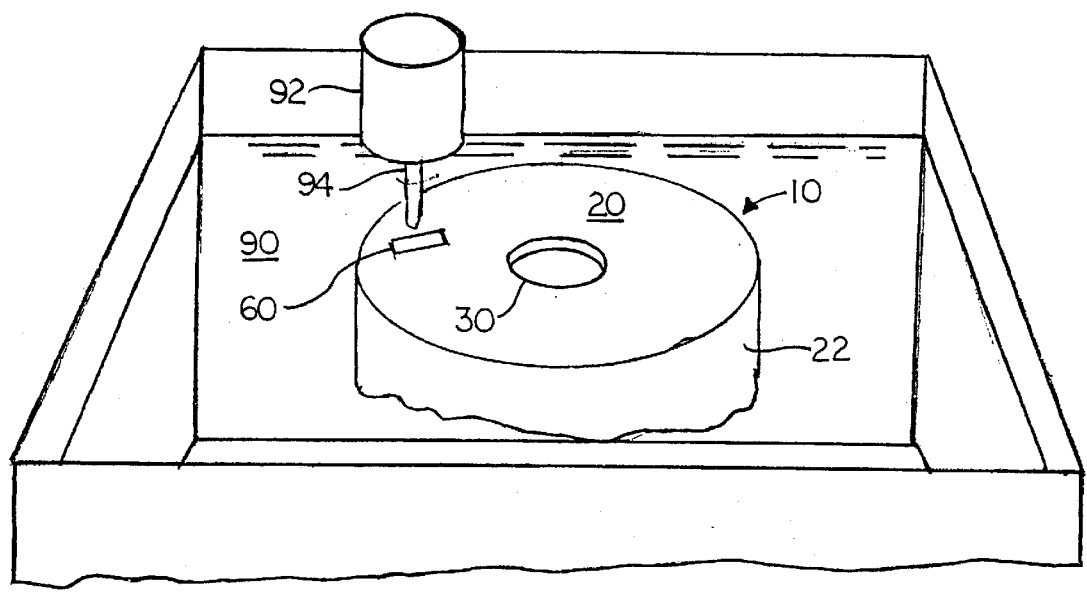
FIG. 5 is a schematic view illustrating a preferred process according to this invention.

For purposes of illustration, as shown in FIG. 5, and in accordance with a preferred embodiment, a central bore 30 and all exterior surfaces 22, 24, and 26, are formed prior to the formation of slots 60. Thus, the one-piece metal blank or work piece shown in FIG. 5 has an exterior configuration corresponding to that of a desired cutter body 10. In FIG. 5, only a portion of a work piece 10, i.e, the first face 20, and a portion of cylindrical sidewall 22, and an end of axial bore 30, are shown. Also for purposes of illustration, only a single slot 60 is shown in FIG. 5.

A plurality of circumferentially spaced slots 60 are formed in the metal blank at desired locations by an electroerosive discharge process, preferably by electron discharge machining (EDM).

The one-piece metal work piece 10 is immersed in a liquid dielectric medium 90. The dielectric medium 90 may be a known liquid suitable for use as a dielectric fluid in EDM processes, and is preferably a hydrocarbon. The dielectric fluid removes heat formed during electric discharge, so that the metal removal process is essentially heatless. This is highly important, since heat buildup can cause distortion of slot shape, and this is avoided in the present process.

Each slot 60 is cut individually by means of a tool 92 having an electrode 94 mounted thereon. The tool 92, including electrode 94, or at least the electrode 94, is reciprocable toward and away from the work piece 10. The tip of the electrode 94 is brought into proximity to that portion of face 20 at which a slot 60 is to be formed. An electric discharge from the electrode 94 to the work piece 10 at 60 causes erosion of metal from the work piece 10, resulting in the formation of a slot 60. Such erosion is continued until the slot 60 extends from one face 20 to the opposite face 28 (not shown in FIG. 5).

Each slot 60 may be formed in the same manner. It is convenient to mount the work piece on a suitable indexing device, which will hold the work piece in position while a slot is being formed, and then rotate the work piece through a desired arc so that the next slot 60 can be formed in the same manner as the first, and so on until all slots 60 are formed. Using CNC methods, the formation of the slots 60 is performed with high accuracy to reduce significantly or eliminate errors in cutter blade positioning.

The dielectric medium 90, the tool 92, and electrode 94 mounted thereon, the spacing between the tip of electrode 94 and the work piece 10, and the discharge voltage, may all be in accordance with materials and operating conditions which are known in the EDM art.

Finally, a plurality of screw holes 70, each communicating with a slot 60, are formed.

The bore 30, the exterior surfaces 22, 24, and 26, and the slots 70 may be formed either by EDM or by conventional means as desired.

After formation of the cutter head or body 10 is complete the cutter head or body 10 is removed from the dielectric medium 90, and may be washed or dried.

Electrical discharge machining (EDM) herein utilizes computer numerical control (CNC) methods to attain highly accurate slot configurations within the one-piece body. The desired slot configuration (or configurations, if a cutter body utilizes more than one slot configuration), is stored in the memory of a program-controlled electronic control device, which controls the movements of electrode 94 relative to work piece 10. Slot configurations are highly precise and accurate and are highly reproducible.

The one-piece cutter body according the present invention in which the slots 60 are formed using EDM methods is stronger and more solid than two-piece cutter bodies known in the art, or even one-piece cutter bodies in which the slots are formed by other methods. Formation of the slots using EDM methods provides a stronger, and structurally stable cutter body as no heating of the body occurs such as upon welding of an outer-machined ring as in presently known two-piece cutter bodies, or in forming slots by other methods, in which some heat build up will occur. While conventional two-piece cutter bodies are fragile and easily damaged, the one-piece cutter body of the present invention are strong and rugged and stand up well when used in gear cutting operations. The configuration of cutter body 10 also allows for repair or correction using similar machining techniques in a simplified and cost-effective manner.

While the present invention has been described in detail with reference to the preferred embodiments thereof, it will be understood that such description is by way of illustration and not limitation, and that various modifications can be made without departing from the scope or spirit of this invention.

What is claimed is:

1. A one-piece cutter body for a cutting assembly used in gear cutting operations, said body being formed from a single piece of metal, said body comprising a cylindrical portion and a frustoconical portion integrally joined thereto, said cylindrical portion including a first face, a sidewall and an annular surface spaced from and parallel to said first face, said frustoconical portion including a second face and a frustoconical surface extending from said annular surface to a second face, said body further comprising a plurality of circumferentially spaced slots formed in said first face in said cylindrical portion and extending through the body and through said second face in said frustoconical portion, said slots being adapted to receive cutting tools in predetermined positions projecting from at least one face of said body.

2. A one-piece cutter body according to claim 1 wherein said slots are formed having a blade seating surface, each of which is formed to precisely position a cutting blade within a respective one of said slots.

3. A one-piece cutter body according to claim 1, said body having an axial bore extending therethrough and a plurality of screw holes extending inwardly from said sidewall to respective slots.

4. A one-piece cutter body according to claim 1 wherein said first and second faces are circular.

* * * * *